Sept. 22, 1959    H. E. SCHIFTER    2,905,487
DOUBLE VALVE CONSTRUCTION AND THE LIKE
Filed July 20, 1956    2 Sheets-Sheet 1
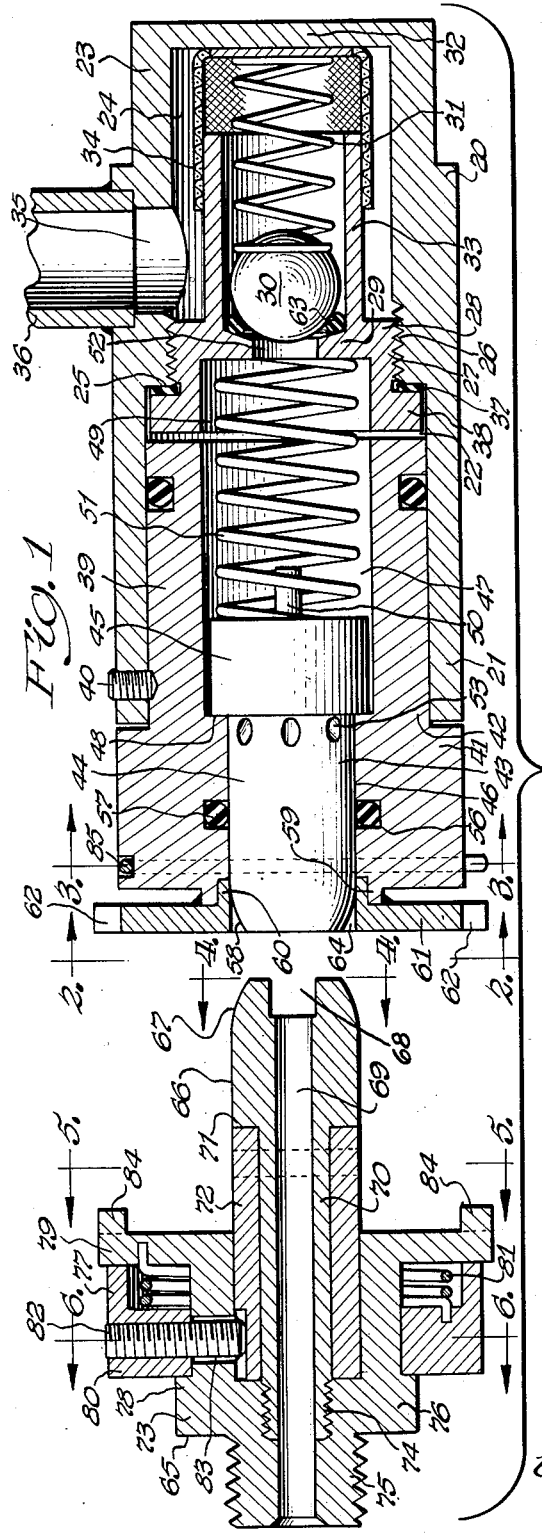
Inventor:
Herbert E. Schifter
by Sherman P. Appel
Attorney Sept. 22, 1959 H. E. SCHIFTER 2,905,487
DOUBLE VALVE CONSTRUCTION AND THE LIKE
Filed July 20, 1956 2 Sheets-Sheet 2
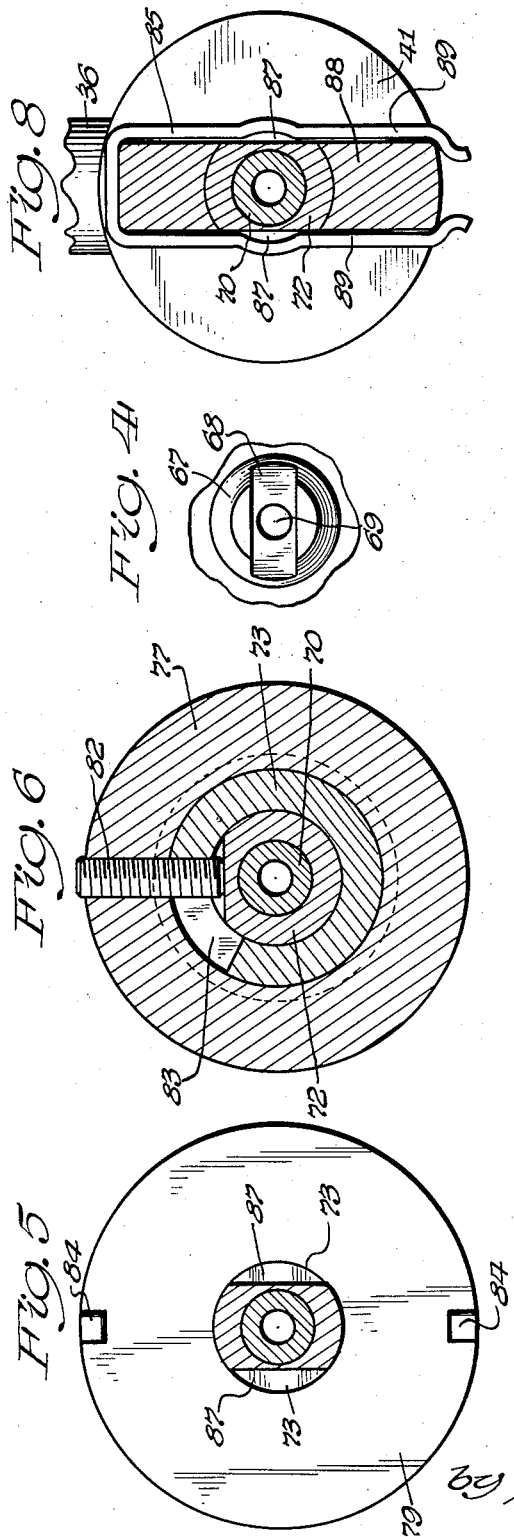
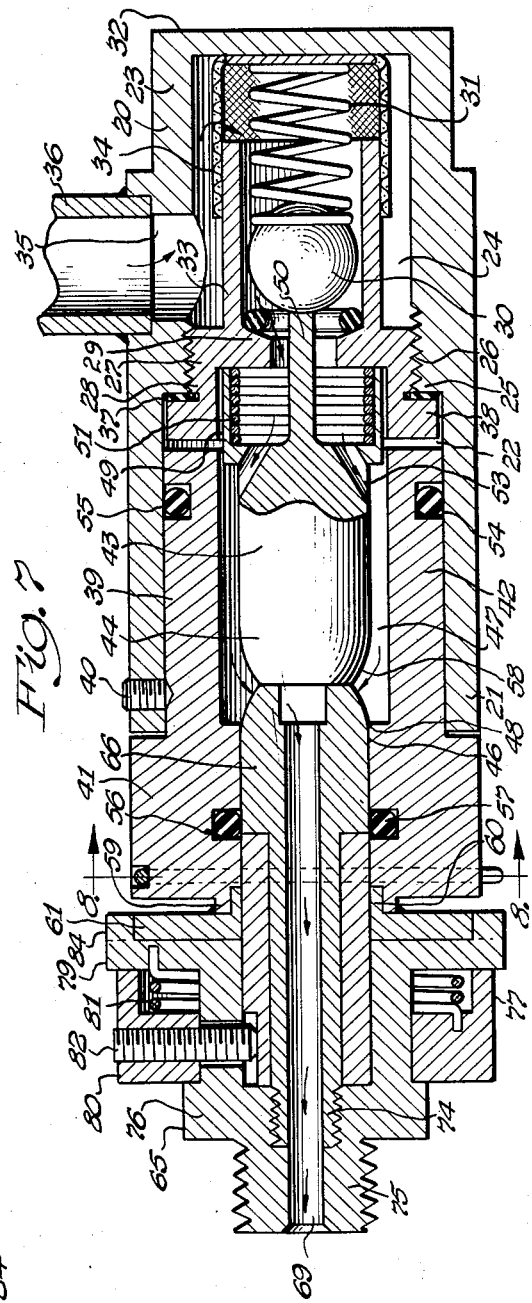
Inventor
Herbert E. Schifter
by Sherman P. Appel
Attorney

United States Patent Office 2,905,487
Patented Sept. 22, 1959

2,905,487

DOUBLE VALVE CONSTRUCTION AND THE LIKE

Herbert E. Schifter, Deerfield, Ill.

Application July 20, 1956, Serial No. 599,104

11 Claims. (Cl. 284—19)

This invention relates generally to apparatus for controlling the flow of fluids. Particularly, it relates to self-closing types of valves and means for opening the same. Specifically, the invention relates to a novel double valve construction to control the flow of gases under high pressure, the components of which may be taken apart while maintaining a check on gas escape, and a valve key or opening mechanism adapted to unseat the double valve to permit the flow of gas therethrough.

Frequently, there is a requirement for a check-type valve construction to control the flow of gas through a high-pressure gas line such as that found in hospitals and the like, where a plurality of different gases may be conducted through conduits in the walls to given locations within the building. For example, many hospitals now provide such gases as anesthetics, oxygen and other gases which are carried under pressure through pipes or conduits which extend through the walls of the hospital. At the location that each gas is to be freed from its conduit, to make it available for use, a check valve is provided which, when opened or unseated, permits the flow of gas therethrough. Because of the nature of certain of the gases, utmost precaution must be exercised to preclude the undesirable escape of each such gas; and should the valve controlling its flow become defective, a hazardous situation might arise because of the undesirable escape of gas.

In accordance with the instant invention, and as a primary object thereof, there is provided a construction comprising a double check valve construction adapted to be mounted in a high pressure gas line and having inner and outer valve check components, the outer of which may be removed in the event of a defect in the outer valve construction while the inner thereof retains a check on the flow of the gas, and the outer of which will check the flow of gas in the event a leak occurs in the inner valve construction.

It is an additional object of the instant invention to provide a valve construction for controlling the flow of gases under high pressure which can only be opened with a matching key.

It is another object of this invention to provide a novel valve key construction with novel release and valve locking means to release said key from a valve construction to close the valve therein, and lock said key in a valve construction to retain the valve therein in open position.

It is a further object of the instant invention to provide a novel double valve construction having an inner valve and an outer valve carrying thereon means for opening the inner valve, the inner valve seat forming a wall of the outer valve, the outer valve comprising a reciprocative member mounted in a housing connected to said valve seat whereby a double valve check is provided on the flow of fluids in the conduit in which said double valve construction is mounted.

Other and further objects of the invention will become apparent from the following description and appended claims, reference being had to the accompanying drawings and numerals of reference thereon.

On the drawings:

Fig. 1 is a longitudinal sectional view of one embodiment of the instant invention, the valve key mechanism being shown withdrawn from the valve.

Fig. 2 is a transverse sectional view taken substantially on the line 2—2 of Fig. 1 and looking in the direction of the arrows.

Fig. 3 is a transverse sectional view taken substantially on the line 3—3 of Fig. 1 and looking in the direction of the arrows.

Fig. 4 is a view taken substantially on the line 4—4 of Fig. 1 and looking in the direction of the arrows, being an end view of the male component of the key mechanism.

Fig. 5 is a transverse sectional view taken substantially on the line 5—5 of Fig. 1 and looking in the direction of the arrows.

Fig. 6 is a transverse sectional view taken substantially on the line 6—6 of Fig. 1 and looking in the direction of the arrows.

Fig. 7 is a longitudinal sectional view of the valve and key mechanism illustrated in Fig. 1 and showing the key mechanism locked in valve open position.

Fig. 8 is a transverse sectional view taken substantially on the line 8—8 of Fig. 7 and looking in the direction of the arrows.

Referring now more particularly to the drawings, there is provided an elongated casing or housing 20 having an open annular end portion 21 within which there is provided an enlarged chamber, passage or bore 22. The housing 20 has, within its closed end portion 23, a reduced chamber or bore extension 24 by reason of an annular shoulder 25 which is provided between housing end portions 21 and 23. The closed end portion 23 is internally threaded at one end thereof with a spirally extending thread 26 which is disposed adjacent the shoulder 25.

The externally threaded hub 27 of a plug or fitting 28 is threadingly secured in housing 20, as illustrated in Figs. 1 and 7. The plug or fitting 28 has an inwardly extending portion which forms apertured ball seat or rest 29 against which the reciprocative ball valve, valve element, component or member 30 is urged by a compression type spring 31 to occlude and seal the ball rest aperture 52. One end of spring 31 engages the ball valve 30 and the other end of said spring forces against the closed end 32 of housing 20.

An annular flange or cylinder which is shown as an integral portion of the plug or fitting 28 and which extends into the chamber or bore 24, being preferably centered therein, comprises the ball valve housing 33. A screen hood 34 is securely mounted over the open end of the ball valve housing 33 and is adapted to filter out any particulate matter that might be carried in the gas. The screen hood 34 abuts against the housing end 32 and is maintained in such abutted position by the spring 31.

The housing 20 is apertured as at 35 to provide a gas inlet opening or port and a gas line 36, only an end fragment of which is shown in the drawings, is secured in said aperture by welding or equivalent means. Gas under pressure is forced from the gas conduit 36 into the chamber 24 through the screen hood 34 and retained within the chamber 24 by the ball valve 30 which will normally check the flow of the gas as long as the ball remains in its seat 29. The plug or fitting 28 hereinabove described is sealed within housing 20 by an annular sealing element 37 which engages across the joint between housing 20 and the plug or fitting 28, the sealing element being disposed between the shoulder 25 and the enlarged annular end flange 38 which is preferably integral with fitting 28, as illustrated in Figs. 1 and 7.

The reduced end portion 39 of a housing, shown as a cylinder 42, is snugly mounted against the housing 20 within the bore 22. The inner end face of the reduced housing or cylinder end portion 39 is slightly spaced from the end of flange 38; and said cylinder 42 is secured in its mounted position by means of a set screw 40 which is threaded through the casing end portion 21, as illustrated in Figs. 1 and 7. The outer end portion 41 of the housing or cylinder 42 is enlarged, as illustrated in Figs. 1 and 7, and the end face thereof is mounted adjacent the open end face of housing 20. A reciprocative valve, valve element, component or member, herein illustrated as a piston, is generally designated by number 43. Valve 43 has a reduced end portion 44 and an enlarged inner portion 45 which is mounted within said housing or cylinder 42. The housing or cylinder outer end portion 41 is provided with a small opening or bore 46 and the housing or cylinder inner end portion 39 is provided with an enlarged bore or opening 47 whereby an annular shoulder, valve seat or rest 48 is provided which arrests the outward movement of the piston or valve 43 by engagement with the valve head or enlarged end portion 45 as valve 43 reciprocates in the valve chamber which is defined in part by the communicating openings or bores 46 and 47.

The bore 47 is communicatively connected with the well 49 formed in plug or fitting 28, with the diameter of well 49 being substantially equal to the diameter of bore 47 in order to accommodate the enlarged valve head or piston end portion 45. Extending inwardly from valve or piston 43 and preferably integral therewith is a valve unseating component or member, here shown as a rigid arm 50 which extends through substantially the center of the cup or well formed in the enlarged valve head or piston end portion 45, as illustrated in Fig. 7. A compression type spring 51 is mounted about the arm or pin 50. The outer end of spring 51 abuts in the cup formed in the enlarged valve head or piston end portion 45, and the opposite end thereof abuts against an end face of the ball rest or seat 29. Accordingly, when the valve 43 is unseated against the action of the spring 51 to the position illustrated in Fig. 7, the arm 50 will unseat the ball valve 30 permitting the flow of gas from the chamber 24 through ball seat aperture 52 into the cup or well formed in the enlarged piston end portion 45, and through bores or conduits 53 which are provided in the reduced valve or piston end 44, as illustrated in Figs. 1 and 7.

To preclude the escape of gas about the cylinder or housing 42, an external annular groove 54 is provided in the reduced cylinder or housing end portion 39 in which I mount a sealing element, preferably an O-ring 55. To preclude the undesirable escape of gas from within the housing or cylinder 42, an annular internal groove 56 is provided in the outer cylinder or housing end portion 41 and a sealing component, being preferably an O-ring 57, is provided therein.

In the embodiment illustrated, the reduced valve or piston end 44 is preferably wholly within the large opening or bore 47 when the piston 43 is in valve open position. Accordingly, to guide the reduced end 44 into the small opening or bore 46 upon closing of the valve, the outer end 58 of the piston is tapered.

The outer housing or cylinder end portion 41 carries an outwardly extending annular flange 59. The hub 60 of a lock plate 61 is disposed in the aperture of flange 59 and secured thereto. The lock plate 61 is centrally apertured as at 64 in alignment with the outer end aperture of the housing or cylinder 42 to accommodate the cylinder end 58 when in valve closed position. The lock plate 61 has a plurality of apertures 62 extending therethrough which may be arranged in any desired position. Accordingly, because of the foregoing construction, locks or plates 61 having differently arranged apertures 62 may be provided on a standardized valve construction such as that hereinabove described and for a purpose to become apparent hereinafter.

From the foregoing, it will be appreciated that even though the connection of the valve construction herein described to the main gas conduit 36 is secured by welding or other rigid or impervious securance, should there be a defect by virtue of which ball valve 30 will not seat in the tapered ball seat 29, for example, the valve may readily be disassembled by loosening the set screw 40 and withdrawing the housing or cylinder 42 and then unscrewing the plug or fitting 28. It also will be appreciated that, should a defect develop in the ball check valve of the double valve construction, the outer valve will preclude the undesirable escape of gas. Furthermore, should a defect develop in the outer valve of the aforesaid construction, the housing or cylinder 42 is readily removable, as aforesaid, the ball valve 30 then checking the flow of gas.

To open the valves of the double valve construction there is provided a key or valve unseating construction, generally designated by the numeral 65. The key is illustrated in vertical section in Figs. 1 and 7. The illustration in Fig. 1 shows key 65 in position withdrawn from the double valve construction, whereas the illustration in Fig. 7 shows the key 65 inserted in the double valve construction whereby the valves 43 and 30 are in open position.

The key 65 comprises a nose or male component 66 having a tapered end 67 to facilitate the guiding of the nose into the aperture 64 and, accordingly, into the housing or cylinder 42 thereafter. As illustrated in Figs. 1, 4 and 7, the nose end 67 is provided with a transverse slot or groove 68 which is communicatively connected with a longitudinally extending bore 69 in the nose. The outside diameter of the nose 66 is reduced whereby an annular shoulder 71 and a reduced nose portion 70 are provided. A sleeve 72 is rotatably mounted on and about the reduced nose portion 70, an end of said sleeve 72 bearing against the shoulder 71.

An apertured fitting, generally designated by the numeral 73, is threaded onto the threaded end 74 of the reduced nose portion 70. The outer end portion 75 of the fitting 73 provides a suitable mounting for the gas hose connection of an appliance not shown.

The body 76 of the fitting 73 is reduced in transverse dimension to provide a seat for the hub 80 of a release ring member 77 which is partially rotatable on the fitting 73. The release ring member 77 is retained in operable position by engagement of the inner portion of hub 80 with an annular fitting shoulder 78 and engagement of the ring portion of member 77 with the key plate 79 between which shoulder 78 and key plate 79 the ring member is confined. The key plate 79 is formed by a radial flange carried on and being integral with the inner end of the fitting 73.

A return spring 81 is mounted within the ring portion of member 77. One end of said spring 81 bears against the key plate 79 in a therein provided aperture for that purpose and the other end of said spring 81 bearing against the ring 77 in a therein provided aperture for that purpose, as illustrated in Fig. 1 and Fig. 7.

A set screw 82 that is threaded through the release ring member 77 extends inwardly through an enlarged slot 83 provided in the fitting 73 and bears against the sleeve 72 to secure and tie said ring 77 to said sleeve 72, as illustrated in Figs. 1, 6 and 7.

The key plate 79 carries a plurality of lugs 84. Said lugs 84 extend outwardly and are disposed on said key plate in a pre-selected manner. Accordingly, unless lugs 84 are matched to the lock plate apertures 62, the opposed faces of lock plate 61 and key plate 79 will be unable to come into engagement in the manner illustrated in Fig. 7. Accordingly, the nose 66 will not be permitted to enter into the housing or cylinder 42 a sufficient distance to cause the pin or arm 50 to unseat the ball valve 30 and the ball valve will remain in closed position. However, when the lugs 84 engage in the slots 62, that is to say, when the proper key 65 is employed, the nose 66 is able to enter into the housing or cylinder 42 a sufficient distance to unseat valve 43 and drive the arm 50 to unseat the ball valve 30. Accordingly, the valve construction is opened, the gas passing in the aforedescribed manner through the double valve construction into the slot 68 and thence through the bore or conduit 69.

The reason that the precaution is taken for matching the key 65 with the lock plate 61 is to preclude use of an undesired gas. For example, if several gases were being employed in and about particular premises, such as a hospital, with the flow of each controlled according to this disclosure, and there was a requirement for oxygen for a patient, and assuming that the various valve constructions were mounted in the wall with only their lock plates 61 exposed, only an appropriate key could open the valve construction controlling the flow of oxygen.

Once an appropriate key is employed, it may be left connected in the valve construction and the construction thereby maintained in open position by virtue of the following: A U-shaped spring or spring clamp 85 is mounted on a restricted end portion or neck 88 provided in the walls of the housing or cylinder 42 in the manner illustrated in Figs. 1, 3 and 8. Because the neck 88 is relatively narrow, the bore or opening 46 is exposed through the neck 88 in therein opposed positions. The spring 85 has two opposed offset portions 86. Each offset portion has a radius of curvature which is slightly smaller than that of the radius of curvature of the nose 66 and of the piston or valve 43. The offset portions 86 are normally disposed adjacent the bore exposures in said neck. Accordingly, as long as the key is not properly seated, the legs 89 of the spring 85 will be separated in the manner illustrated in Fig. 3.

The sleeve 72 has a pair of opposed grooves or slots 87, illustrated in Figs. 5 and 8 and in dotted lines in Figs. 1 and 7. The grooves 87 are on opposite sides of the sleeve and are positioned at a distance that will permit the spring legs 89 to engage in said grooves in the manner illustrated in Fig. 8 when the end face of lock plate 79 engages the outer face of the lock plate 61. Accordingly, the key is locked in valves open position. In order to release the key, the release ring member 77 is rotated, the rotation being permitted with the limits of the slot 83. Such rotation causes rotation of the sleeve 72 by virtue of the aforedescribed construction. The rotation of the sleeve 72 forces the spring 85 apart, because spring legs 89 become unseated from the grooves 87 and are held apart by the normal curvature of the sleeve. Thus, the key 65 is released and can be easily withdrawn to permit the valve or piston 43 to be forced into its seat under the action of spring 51 and the ball valve 30 to be forced into its seat 29 under the action of spring 31.

Under the force of the spring 81, the partially rotated release ring member 77 will return to its normal position.

As many changes or substitutions could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. An article of manufacture comprising a fitting having an end portion thereof adapted to be secured to an appliance, said fitting having a longitudinally disposed passage extending therethrough; an elongated nose carried on said fitting; a sleeve rotatably mounted on said nose; a spring-pressed release ring operably secured to said sleeve, said sleeve having groove means therein whereby said article is releasably locked in operable position.

2. A key and the like comprising a sleeve; a rigid male opening element journalled in said sleeve; a fitting operably secured to said male element and having a slot therein; a release ring, said fitting being journalled in said release ring; a tie, said tie securing said sleeve to said release ring, and a spring operably connected to said release ring whereby the sleeve may be rotated out of locked position and returned.

3. A key and the like comprising a sleeve, said sleeve having a pair of opposed locking grooves whereby said key may be locked in operable position; a fitting having therein a slot, said sleeve being journalled in said fitting; a release ring rotatably mounted about said fitting; a tie element, said tie being operably connected to said sleeve and said ring, the engagement of said tie with said slot edges arresting the rotation of said sleeve and said ring, and ring return spring means mounted about said fitting.

4. A key and the like comprising an elongated nose having a reduced portion; a sleeve rotatably mounted about said reduced nose portion, an end of said nose being threaded; a fitting secured on the threaded nose end, said sleeve being journalled in said fitting; a release ring member having a hub and a ring portion; said fitting being journalled in said hub and having a slot; a tie extending through said slot and operably connecting said release ring member and said sleeve; a ring return spring mounted within said ring and being operably connected thereto, said sleeves having opposed grooves adapted to lock said key in operable position, the key being released by rotation of ring, the ring being returned to original position by said spring.

5. A valved structure comprising a housing having openings therein, said housing having a bore therein; a clamp mounted about said housing and disposed in said openings; operable valve means within said bore for opening and sealing said bore; a passaged key normally disposed in said bore when said valve means is in bore open position, the passage in said key adapted to conduct fluids from said bore, said key normally holding said valve means in bore open position, said key having clamp securing means disposed at said openings, and a clamp release mechanism whereby the clamp releasably locks said key in said bore to hold said valve means in bore open position.

6. A valved structure comprising a housing having a bore; an operable valve mechanism within the housing bore including a reciprocative component for closing and opening said bore, said housing having openings; a spring mounted about said housing over said openings and distended by said reciprocative component as said reciprocative component moves to bore closed position; a key, said key having an elongated nose adapted to enter said bore and move said reciprocative component; a sleeve mounted about said nose and having opposed grooves, the spring being seated in said groves releasably locking said key in said bore when said reciprocative component is in bore open position.

7. The combination of a valved structure and a key for opening said valved structure in which the valved structure comprises a housing having therein a passage; a flexible clamp mounted about said housing; a reciprocative member within said housing for opening and closing said passage, said reciprocative member having clamp engaging portions, said clamp distended when said reciprocative member is in passage closed position; said key having a nose extending outwardly from said key and normally disposed in said passage, said nose holding said reciprocative member in passage open position, said nose having a conduit communicating with said passage when open, said clamp releasably engaging and retaining said key when said nose is holding said reciprocative member in passage open position.

8. A valve construction comprising a first housing member having a communicating inlet port and an open end adapted to permit passage of gases through said first housing; a first valve seat releasably secured within said first housing and withdrawable from the open end thereof; a reciprocative first valve engaging said first valve seat to block the communication between said port and said open end when said first valve is in closed position; a second housing having communicating gas inlet and outlet openings, said second housing releasably secured within said first housing and withdrawable from the open end thereof; a second valve seat disposed within said second housing; a reciprocative second valve engaging said second valve seat to block the communication between said gas inlet and outlet openings when said second valve is in closed position; valve closing means disposed within said housing and normally urging said valves to closed position thereof, and means disposed within said housing to cause opening of one valve when the other thereof is unseated.

9. A valve construction comprising a first housing, said first housing having a communicating inlet opening and an open end adapted to permit passage of gases through said first housing; a first valve seat releasably secured within said first housing and withdrawable from the open end thereof; a reciprocative first valve engaging said first valve seat when said first valve is in closed position; first valve closing means disposed in said first housing and urging said first valve to closed position; a second housing having communicable gas inlet and outlet openings, said second housing being releasably secured within said first housing and withdrawable from said open end; a second valve seat within said second housing; a reciprocative second valve engaging said second valve seat when said second valve is in closed position; second valve closing means disposed in said second housing and urging said second valve to closed position, and a valve unseating component carried by said second valve whereupon unseating of said second valve, said first valve is unseated and gases from said first housing pass through the inlet and outlet openings of said second housing.

10. A valve construction comprising a housing means having a gas inlet port; a first valve seat releasably secured within said housing means and defining a pair of gas conducting valve chambers, said first valve seat having an opening therein whereby said chambers are communicatively connectible; said housing means defining a second valve seat, said second valve seat having a gas outlet opening, a valve reciprocatively disposed in each of said chambers, valve closing means disposed in said chambers whereby each valve normally is seated in a respective valve seat to close said valve construction, and a valve unseating member operably connected to and actuated by one of said valves whereupon opening of the same, the other valve is engaged and unseated.

11. A valve structure comprising a housing having openings therein, said housing having a bore therein; a clamp mounted about said housing and disposed in said openings; operable valve means within said bore for opening and sealing said bore; a passaged key normally disposed in said bore when said valve means is in bore open position, said key normally holding said valve means in bore open position, said key having clamp engaging means whereby said clamp locks said key in said bore to hold said valve means in bore open position.

References Cited in the file of this patent
UNITED STATES PATENTS

| | | |
|---|---|---|
| 1,740,015 | Hooper et al. | Dec. 17, 1929 |
| 1,818,124 | Engbrecht | Aug. 11, 1931 |
| 2,181,758 | Goon et al. | Nov. 28, 1939 |
| 2,203,922 | Paisley | June 11, 1940 |
| 2,370,182 | Morrow et al. | Feb. 27, 1945 |
| 2,742,052 | McKee | Apr. 17, 1956 |